Figure 4:
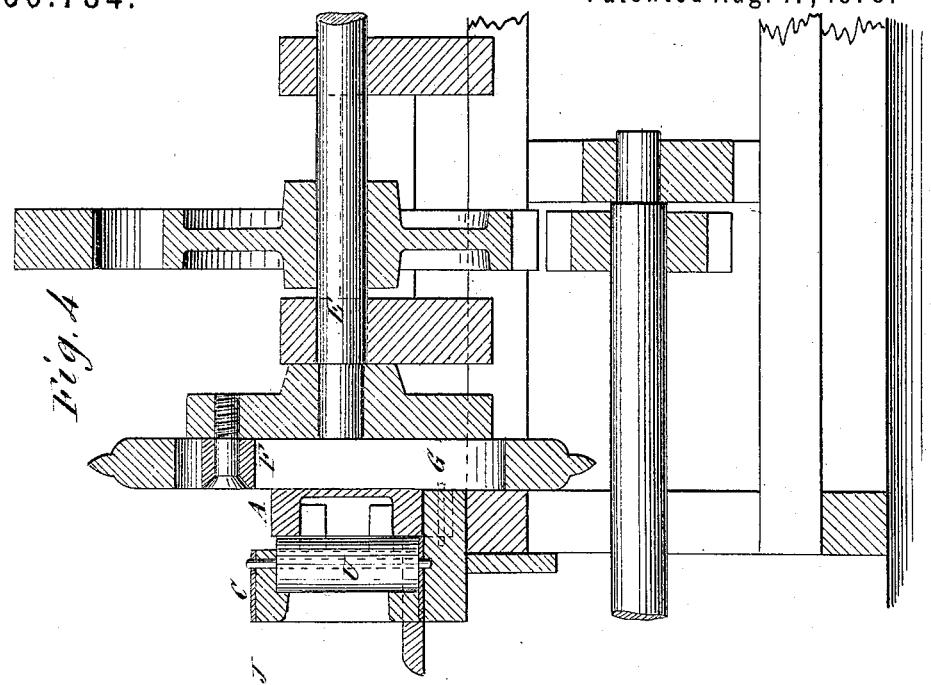

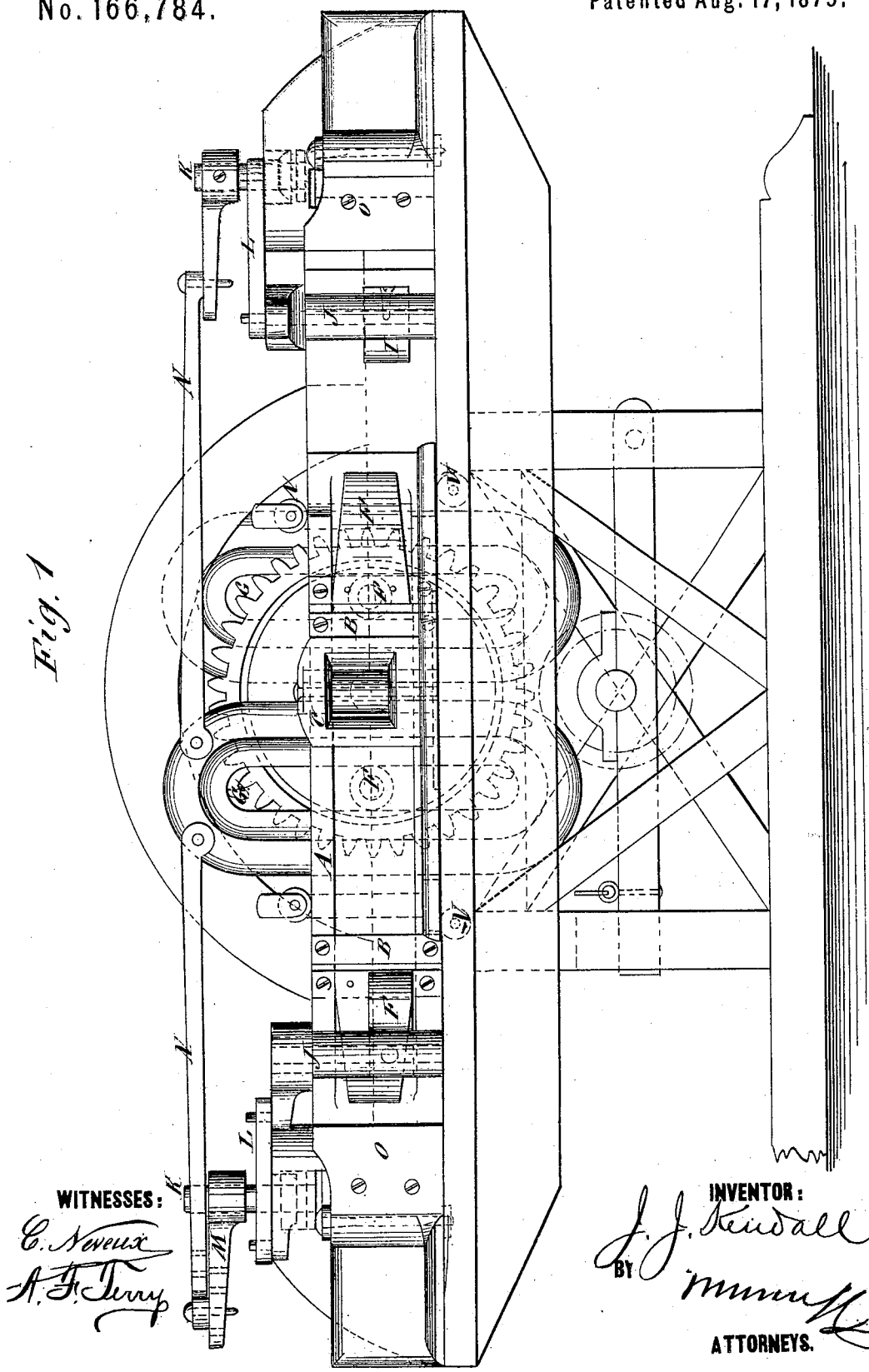

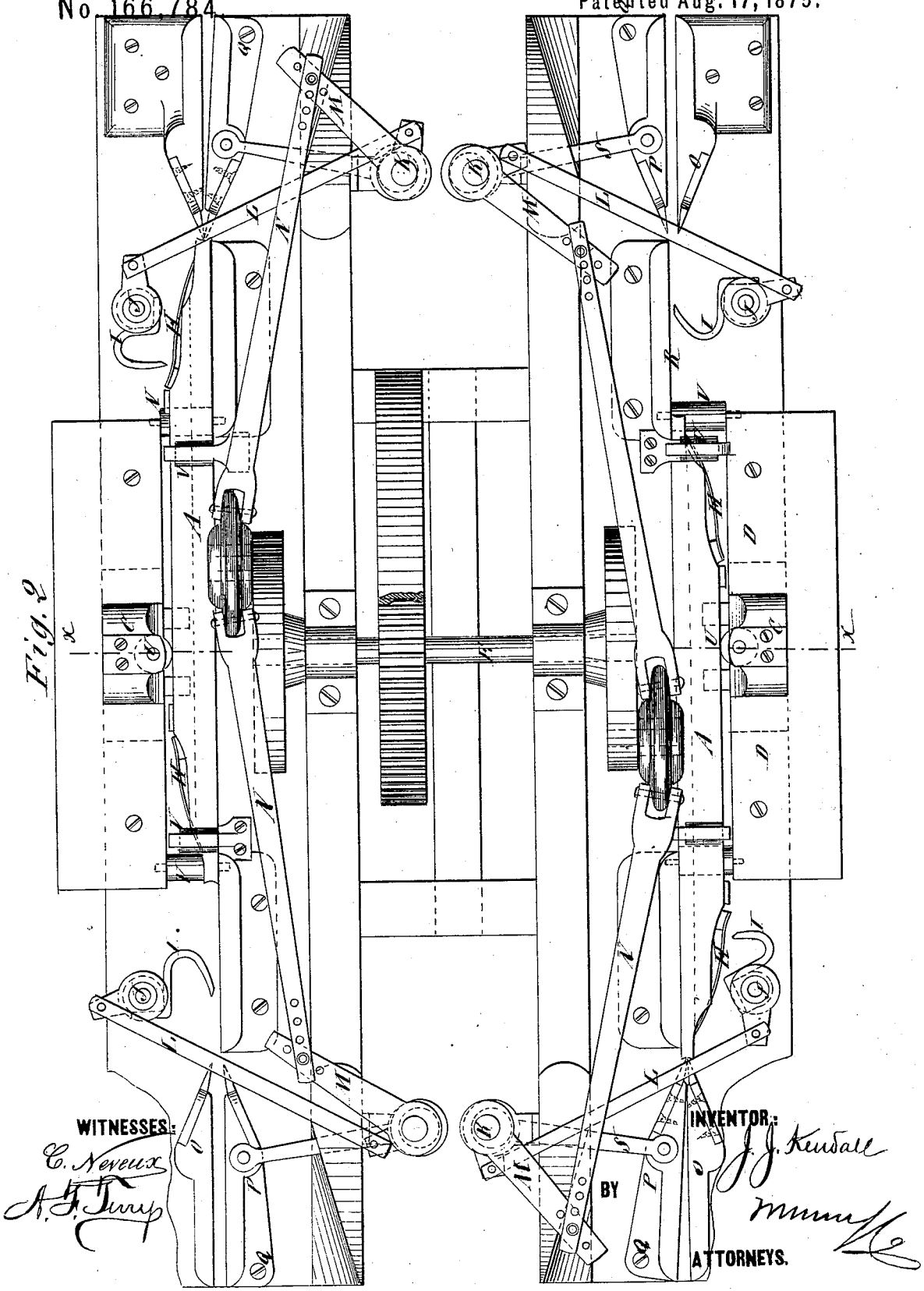

J. J. KENDALL.
Shingle-Machine.

No. 166,784.

3 Sheets--Sheet 3.

Patented Aug. 17, 1875.

WITNESSES:
E. Neveux
A. F. Terry

INVENTOR:
J. J. Kendall
BY
ATTORNEYS.

N. PETERS, PHOTO-LITHOGRAPHER, WASHINGTON, D. C.

UNITED STATES PATENT OFFICE.

JOHN J. KENDALL, OF GREENSBOROUGH, NORTH CAROLINA.

IMPROVEMENT IN SHINGLE-MACHINES.

Specification forming part of Letters Patent No. 166,784, dated August 17, 1875; application filed May 8, 1875.

*To all whom it may concern:*

Be it known that I, JOHN J. KENDALL, of Greensborough, in the county of Guilford and State of North Carolina, have invented an Improvement in Shingle-Machines, of which the following is a specification:

The invention will first be described in connection with the drawing, and then pointed out in the claims.

Figure 3:
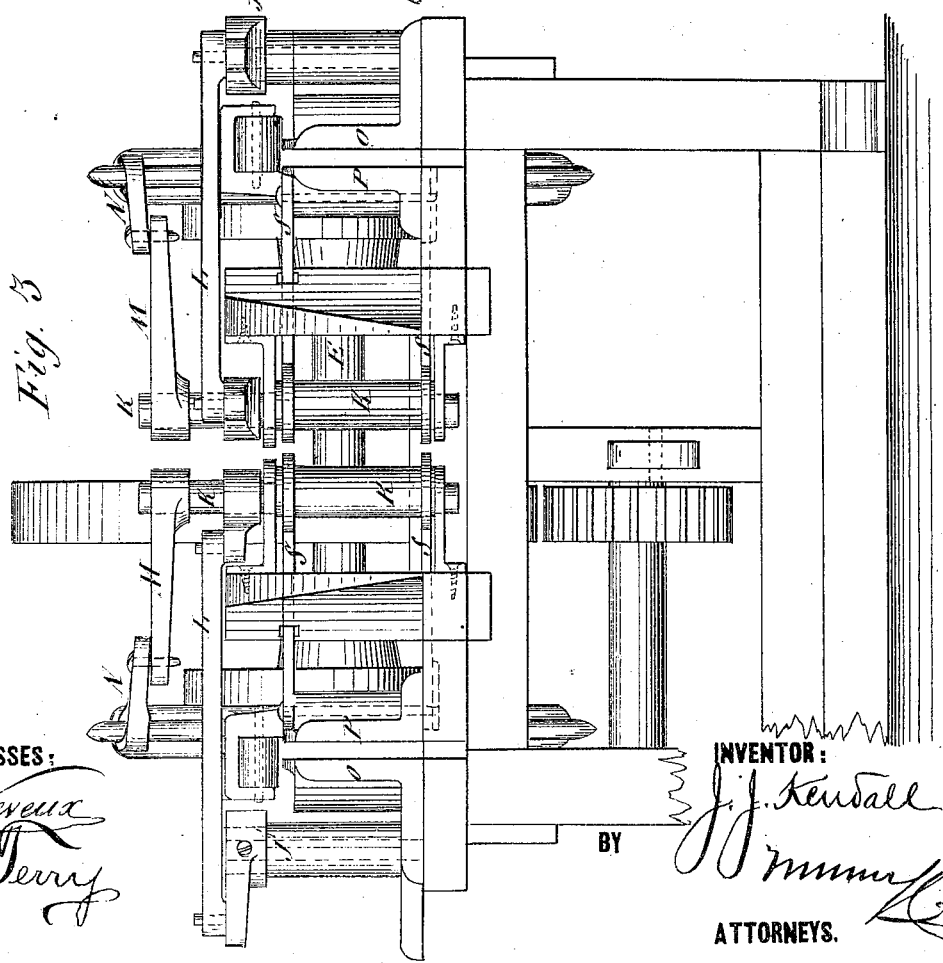

Figure 1 is a side elevation of my improved shingle-machine. Fig. 2 is a plan view. Fig. 3 is an end elevation, and Fig. 4 is a section on line $x\ x$ of Fig. 2.

Similar letters of reference indicate corresponding parts.

A represents the reciprocating driving-heads, carrying two knives, B, and working alongside of the stationary heads C, against each side of which a bolt is to be held on the table D by an attendant, so that a shingle will be riven by each movement. E is the crank-shaft for moving the heads by a wrist, F, working in a slot, G. H represents the spring-clamps behind the cutters, receiving the blanks cut off from the bolts between them and the side of the head, to hold them ready for the feeders, which consist of the swinging dogs I, placed on the vertical oscillating shafts J, operated by the oscillating shafts K, to which they are connected by rods L. The shafts K are worked by the riving-heads A, to which they are connected by arms M and rods N. The feeders catch in the sides of the blanks by thin notched and pointed ends, and push them along the stationary guides R, between the shaving-cutters O P, so that when they pass off from the riving-heads they drop in front of their ends, to be pushed by them through the shaving-cutters. These cutters are open when the blanks are pushed in by the feeders, one, P, being arranged on a pivot, Q, and connected, by rods S, with an eccentric, T, on the rock-shaft K, which closes it on the blank just before it begins to be pushed along, and continues to move it toward the other cutter until the end comes to the cutters, thus producing the requisite taper. The eccentric opens the cutters again just before the feeder works ready for receiving another blank, and immediately after the feeder works the riving-head comes against the blank fed into the cutters, and pushes it forward. The rods N and arms M are connected, so as to change the throw of the eccentric to open and close the shaving-cutters more or less, according to the required thickness of the shingles. The cutters B will also be adjustable, to vary the thickness of the blanks. The heads C have a friction-roller, U, for guiding and controlling them, and above and below these heads are other rollers, V, for the same purpose.

By the combination of two of these double-acting machines with one crank-shaft, a machine of great capacity is obtained, and the power is better utilized, for it enables them to be so adjusted that one machine will be in labor when the other is idle.

The machine is applicable for making staves, barrel-heads, and other things of similar character by having the cutters and the riving-head properly adjusted for the particular kind for which they are to be used.

Having thus described my invention, I claim as new and desire to secure by Letters Patent—

1. The combination of a double-faced stationary head and two riving-cutters with a reciprocating riving-head, substantially as shown and described, whereby a blank may be rived by each movement of the head, substantially as specified.

2. The combination of the spring-clamp F and feeder I with the movable riving-head, substantially as specified.

3. The feeder I, combined with the movable riving-head and the guideway R in the arrangement described, whereby the blank is shifted in front of the head when presented to the cutters, substantially as specified.

4. The oscillating cutter P, in combination with the eccentric T, rock-shaft K, and the rock-shaft geared with the riving-head A, substantially as specified.

5. The feeder I, rock-shaft J, connecting-rod L, rock-shaft K, arm M, rod N, and the riving-head, combined substantially as specified.

6. The combination of the riving-heads and their adjuncts with a double-cranked driving-shaft, E, substantially as specified.

JOHN J. KENDALL.

Witnesses:
JAMES SLOAN,
J. J. HERITEGE,
JOHN B. TAYLOR.